United States Patent [19]

Müller

[11] Patent Number: 4,647,161

[45] Date of Patent: Mar. 3, 1987

[54] FISH EYE LENS SYSTEM

[76] Inventor: Rolf Müller, Johann-Georg Schultheiss Weg 3, 7742 St. Georgen, Fed. Rep. of Germany

[21] Appl. No.: 748,228

[22] Filed: Jun. 24, 1985

Related U.S. Application Data

[63] Continuation-in-part of Ser. No. 379,762, May 19, 1982, Pat. No. 4,525,038.

[51] Int. Cl.⁴ .......................... G02B 9/34; G02B 9/60
[52] U.S. Cl. .................................................... 350/462
[58] Field of Search ................ 350/462, 469, 439, 450

[56] References Cited

U.S. PATENT DOCUMENTS 3,734,600  5/1973  Shimizu .................. 350/462

FOREIGN PATENT DOCUMENTS 0032319  3/1979  Japan .................................. 350/462

Primary Examiner—John K. Corbin
Assistant Examiner—Rebecca D. Gass
Attorney, Agent, or Firm—Fitch, Even, Tabin & Flannery

[57] ABSTRACT

A high performance medium speed fish eye lens system is provided, capable of compensating all aberrations except the distortion at an aperture ratio of at least 1:4.2. The lens system consists of a first lens group (G1) of negative refractive power including two negative lenses curved towards the object, a middle positive lens component (G2) curved towards the object, which lens component can be composed of a cemented doublet, and a last lens group (G3) of positive refractive power consisting of a cemented doublet or a cemented doublet and an additional positive single lens both curved towards the image.

15 Claims, 13 Drawing Figures

FISH EYE LENS SYSTEM

This is a continuation-in-part of Ser. No. 379,762 filed May 19, 1982, now U.S. Pat. No. 4,525,038.

BACKGROUND OF THE INVENTION

1. Field of the Invention

The present invention relates to a photographic fish eye lens system which has a field angle of more than 140°, particularly to an improved lens system having a very high resolution power at an aperture ratio of at least 1:4.2 and which can be applied to SLR-cameras.

2. Description of the Prior Art

Fish eye lens systems are known since 1932 (DRP. 620,538). Further suggestions have been made in the "Journal of the Optical Society of America" No.41 (1951), Page 1058–1059 and in the U.S. Pat. No. 3,331,653. These early fish eye lens systems were rather simple and the compensation of some of the aberrations was not sufficient or was even impossible. Particularly the lateral chromatic aberration was a problem which could not be solved. Therefore the resolution power of these lens systems was poor, even if they were used at small aperture ratios.

In the years following 1965 numerous fish eye lens systems of a higher performance have been designed, but the high number of lens elements is the common big disadvantage of these designs. They consist of 8 to 12 lens elements and they therefore are rather expensive and heavy (U.S. Pat. Nos. 3,515,462; 3,524,697; 3,597,049; 3,734,600; 3,741,630; 3,850,509; 4,009,943 and 4,256,373). Other disadvantages of some of these systems are the poor resolution power at large field angles and fully opened aperture stop, and—consequently—the decreasing brightness at the edges of the image, since the deviating light rays must be cut off by vignetting on the rims of the lens elements in order to achieve a sufficient sharpness of the image.

SUMMARY OF THE INVENTION

The purpose of the invention is to disclose a new fish eye lens system of rather simple construction and a very high resolution power at medium aperture ratios, to be used on SLR-cameras.

The disclosed lens system consists of a first lens group (G1) including two single lenses (L1 and L2) of negative refractive power both curved towards the object; a middle lens component (G2) of positive refractive power curved towards the object, which lens component can be a single meniscus shaped lens (L3) or a cemented doublet (L3/L4) of similar outer shape and a last lens group (G3) of positive refractive power consisting of a cemented doublet (L5/L6) or a cemented doublet (L4/L5) and an additional positive lens (L6), which is positioned on the image side of and in close distance to the doublet (L4/L5).

All lens elements of the last lens group (G3) are curved towards the image.

The aperture stop (B) is positioned between the middle lens component (G2) and the last lens group (G3).

An optical filter (F) can be inserted between the first lens group (G1) and the middle lens component (G2) or between the middle lens component (G2) and the last lens group (G3).

A fish eye lens system according to the present invention offers high contrast and high resolution power at an angle of field of 150° to 180° and an aperture ratio of about 1:4.

BRIEF DESCRIPTION OF THE DRAWINGS

The FIGS. 1 to 4 show longitudinal sections of fish eye lens systems according to the present invention. They show in particular.

Figure 1:
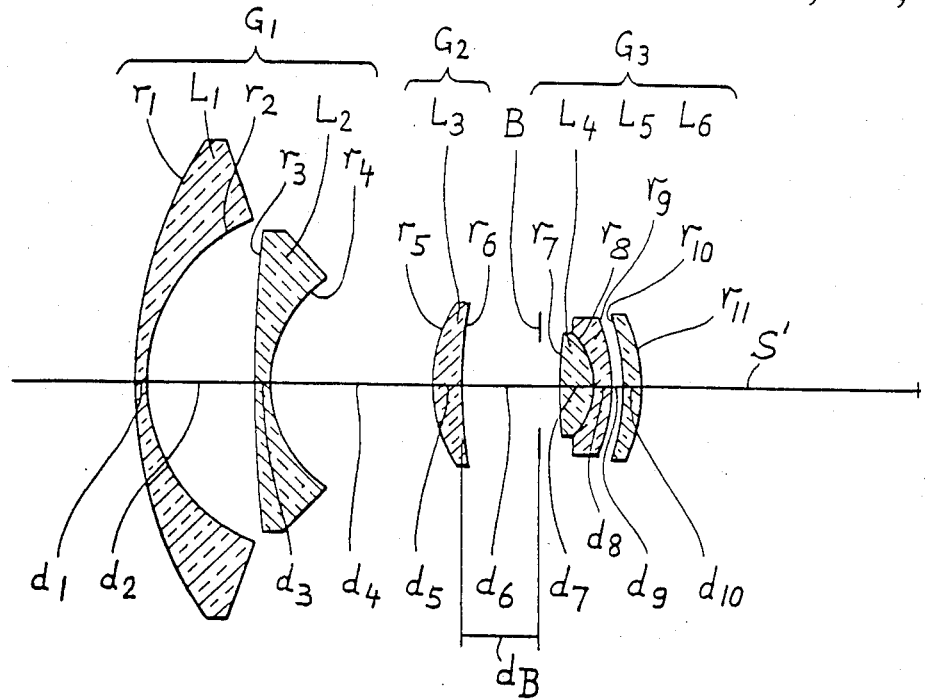
FIG. 1 a section of a lens system according to claim 1, 4 and 5.
Figure 2:
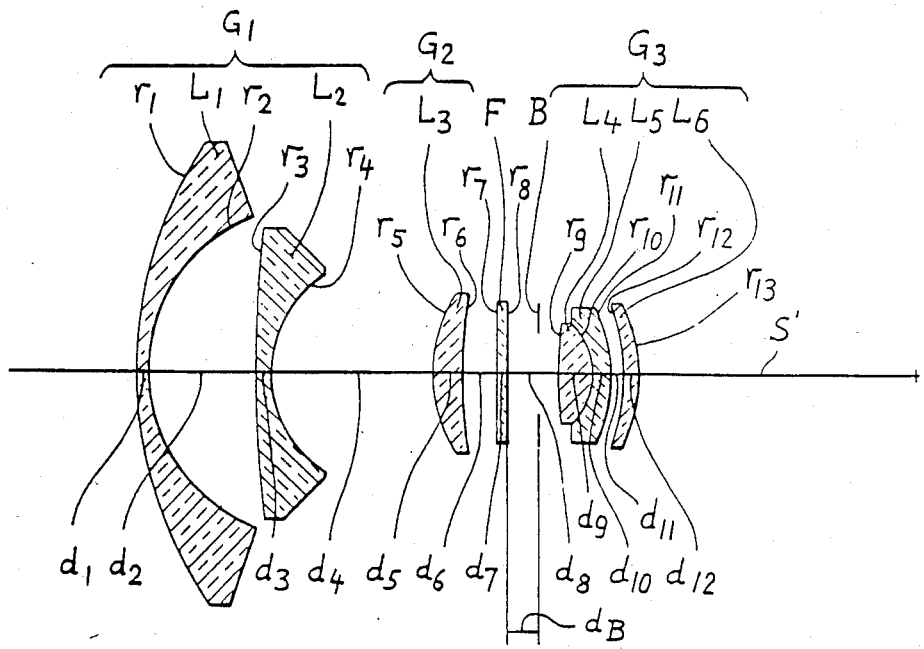
FIG. 2 a section of a lens system according to claim 3 and 6–9.
Figure 3:
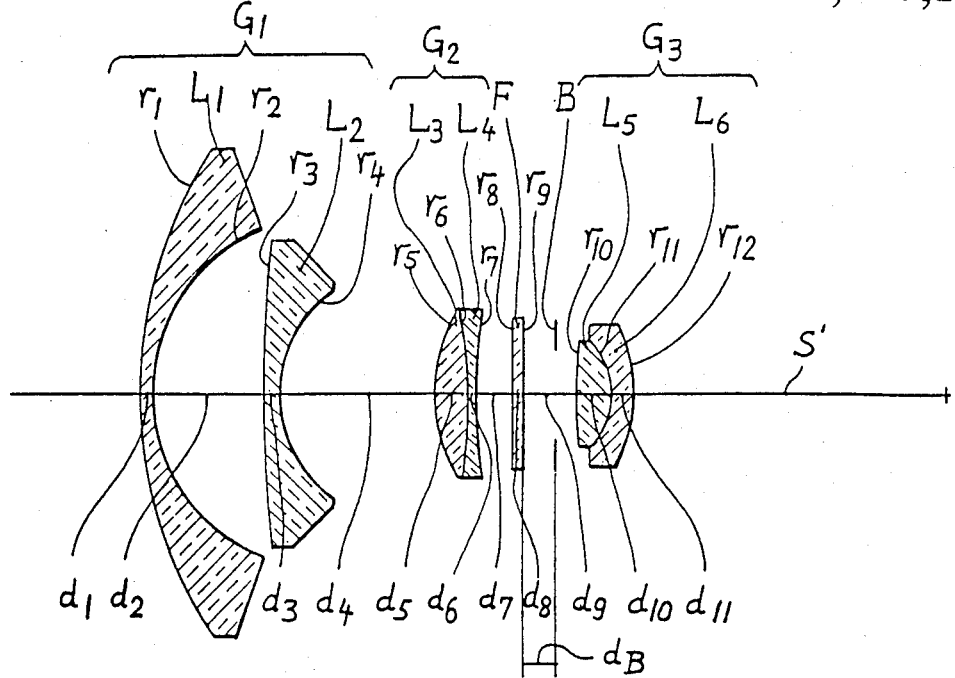
FIG. 3 a section of a lens system according to claim 12 and 13.
Figure 4:
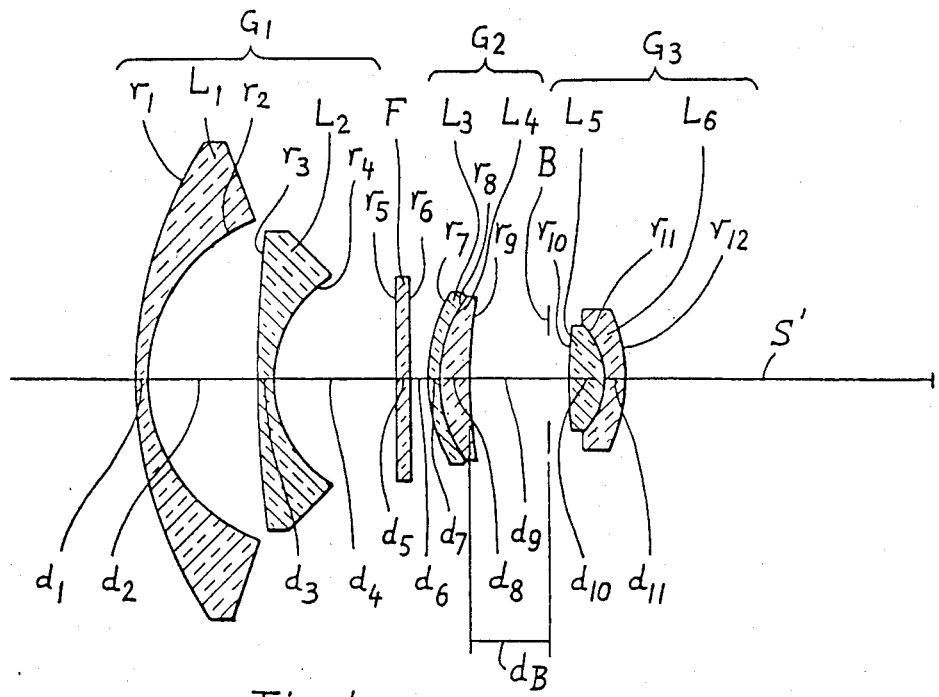
FIG. 4 a section of a lens system according to claim 12, 14, 15.
Figure 5:
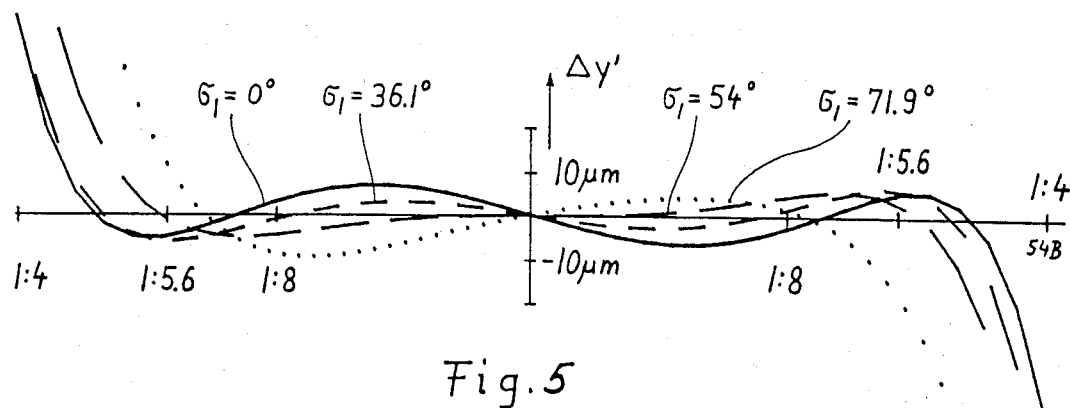

The FIGS. 5 to 13 show meridional deviations delta-y' versus the aperture ratio at different field angles sigma 1 and the d-line, in particular:

FIG. 5 lateral deviations of a lens system accord. to claim 4.

Figure 6:
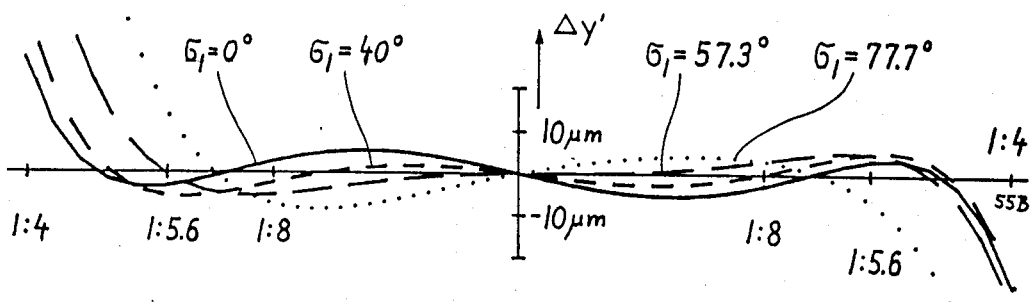

FIG. 6 lateral deviations of a lens system accord. to claim 5.

Figure 7:
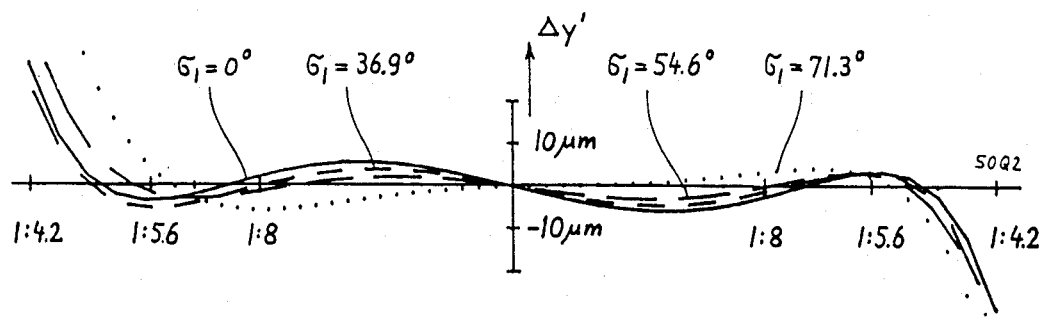

FIG. 7 lateral deviations of a lens system accord. to claim 6.

Figure 8:
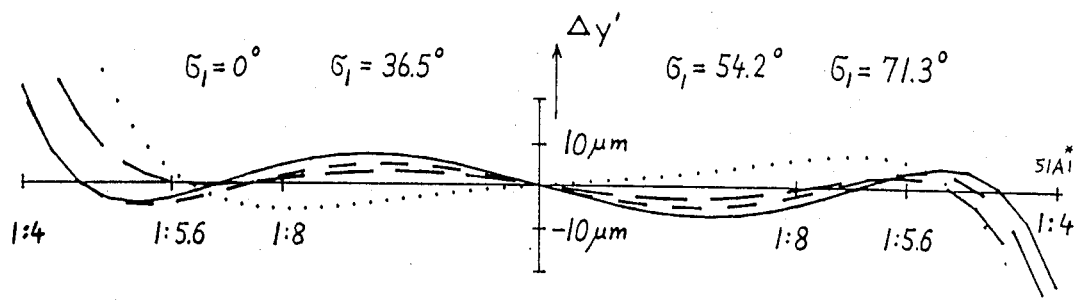

FIG. 8 lateral deviations of a lens system accord. to claim 7.

Figure 9:
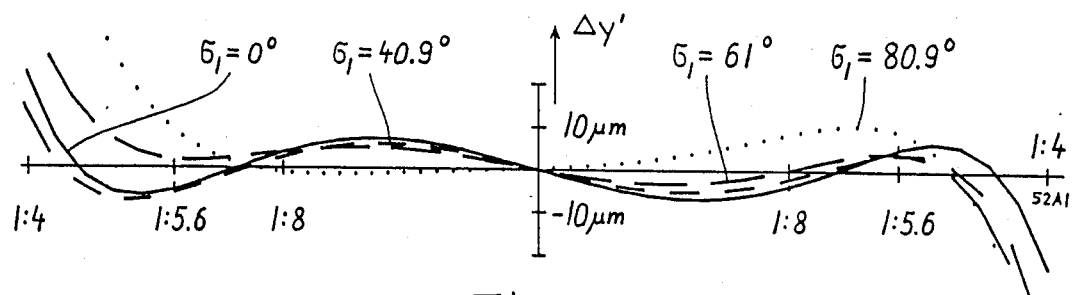

FIG. 9 lateral deviations of a lens system accord. to claim 8.

Figure 10:
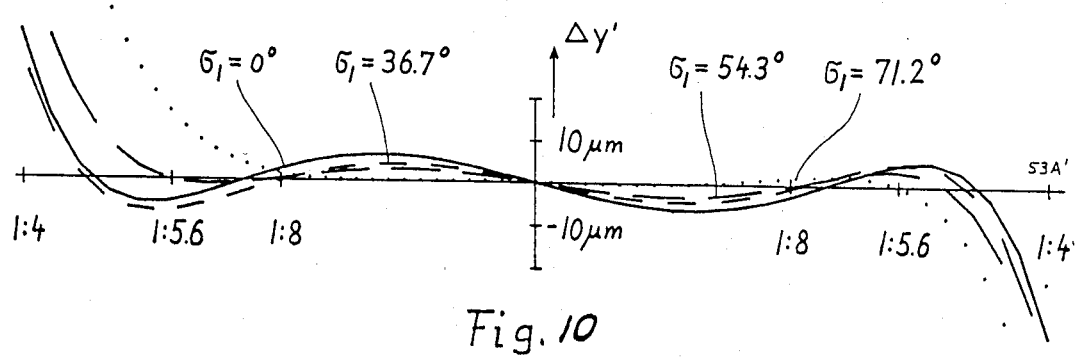

FIG. 10 lateral deviations of a lens system accord. to claim 9.

Figure 11:
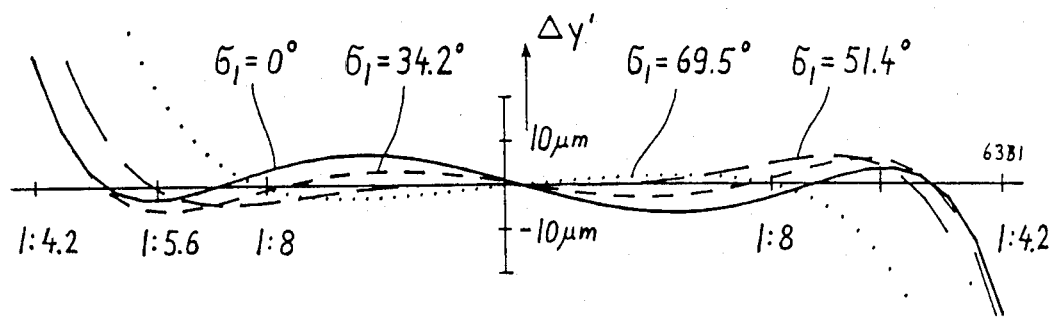

FIG. 11 lateral deviations of a lens system accord. to claim 13.

Figure 12:
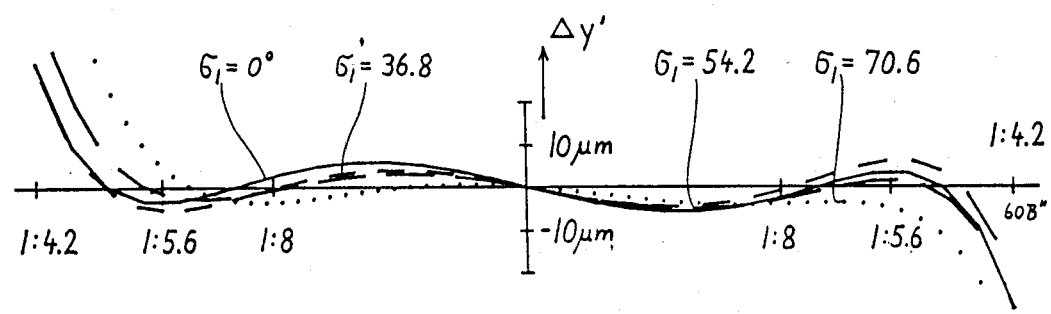

FIG. 12 lateral deviations of a lens system accord. to claim 14.

Figure 13:
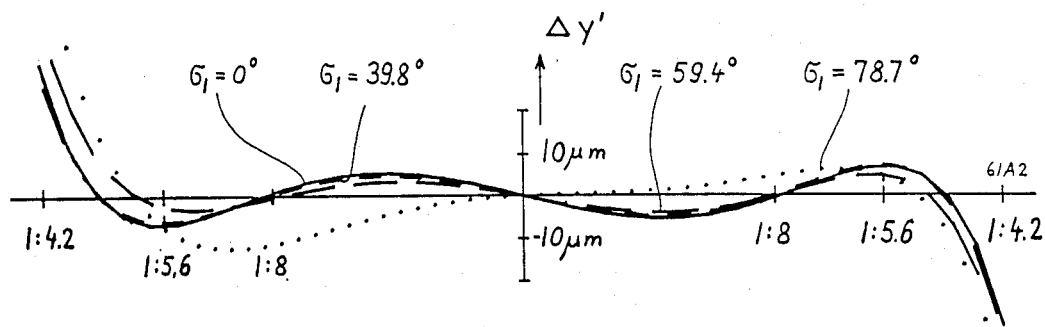

FIG. 13 lateral deviations of a lens system accord. to claim 15.

BRIEF DESCRIPTION OF THE PREFERRED EMBODIMENT

The first lens group (G1) consisting of two negative lenses L1 and L2 form the negative front member of the system, which is necessary for a retrofocus lens system for obtaining a long back focal length and a short effective focal length. The construction of this front member—according to the present invention—of two single curved lenses of a high negative refractive power is an especially simple embodiment of this front member, which enables the system to meet all requirements of a high performance fish eye lens system.

This front member largely contributes to the planeing of the image field, since both lenses have a great negative contribution to the Petzval-sum. Moreover, especially the second negative lens L2 contributes with its concave surface which faces the image to the compensation of the aberrations of the following two lens groups by a negative coefficient of the spherical aberration, by a high negative coefficient of astigmatism and above all by a high positive coefficient of the coma.

But on the other hand, the negative front member introduces a considerable negative coefficient of lateral chromatic aberration and a positive coefficient of distortion into the system.

The middle lens component (G2) has the outer shape of a positive meniscus lens curved towards the object and consists of a single lens element (L3) or a cemented doublet (L3;L4) representing about 60% of the positive refractive power of the whole lens system.

The resulting Abbe-number of the middle lens component (G2) amounts from 30 to 45, whereby a great portion of the lateral chromatic aberration, caused by the negative front member, can be compensated.

On the other side, the middle lens component (G2) causes on its convex surface which faces the object—the highest positive coefficient of the spherical aberration and about 50% of all positive chromatic focal aberration coefficients of the entire system.

Thus, behind the middle lens component, the spherical aberration coefficient and the chromatic focal aberration coefficient of the middle lens component are dominating, while the sum of the coma and the distortion coefficients are substantially determined by the negative front member.

In order to optimize the chromatic correction and to reduce the spherical aberration it is advantageous to compose the middle lens component of a cemented doublet, which also offers the opportunity to reduce the secondary lateral chromatic aberration by using "short flint" glass as KzFS7. The lenses of the last lens group have a positive resulting refractive power, which represents approx. 40% of the positive refractive power of the entire lens system. The radii of the cemented surfaces of the first (positive) lens and the negative lens of the last lens group (G3) amounts between $-0.45$ and $-0.75\,f$, wherein f represents the effective focal length of the entire lens system.

Since the refraction index of the negative lens of the last lens group is considerably higher than the refraction index of the first lens of this group, the cemented surfaces of these lenses, act divergent, and therefore are substantially contributing to the compensation of the spherical aberration.

Moreover, they cause an important contribution to the compensation of the chromatic focal aberration since the glass of the second lens of said lens group has a substantially lower Abbe's-number than the first lens of this group.

The convex surface of the second lens of this group, facing the image, adds an important contribution to the spherical aberration and to the chromatic focal aberration. It also introduces a positive amount into the field curvature and the Petzval-sum, as well as a considerable negative coefficient of the coma.

Because of the high contribution of this lens surface to the spherical aberration it is advantageous to increase the radius of this surface in order to reduce the spherical aberrations and to introduce an additional positive meniscus shaped lens on the image side of the cemented doublet of this lens group in order to achieve sufficient positive refractive power.

This third lens in the last lens group also offers additional opportunities to reduce the lateral chromatic aberrations.

The design parameters of a fish eye lens system according to the invention satisfy the following conditions:

| | | | | |
|---|---|---|---|---|
| 0.6 | < | $f_I/f$ | < | 1.2 | (1) |
| 1.0 | < | $d_4/f$ | < | 1.5 | (2) |
| 0.75 | < | $r_4/f$ | < | 1.1 | (3) |
| 1.5 | < | $f_{II}/f$ | < | 2.5 | (4) |
| 30 | < | $v_{II}$ | < | 45 | (5) |
| 0.5 | < | $d_{II}/f$ | < | 0.95 | (6) |
| 2.1 | < | $f_{III}/f$ | < | 4.0 | (7) |
| 0.7 | < | $f_p/n_p$ | < | 1.25 | (8) |
| 1.15 | < | $n_N/n_P$ | | | (9) |
| | | $v_N/v_P$ | < | 0.5 | (10) |
| 0.45 | < | $r_{IV}/f$ | < | 0.75 | (11) |

Wherein:

f represents the effective paraxial focal length of the whole lens system, $f_I$ represents the focal length of the first lens group (G1), $r_4$ represents the fourth radius of the lens system, $d_4$ represents the distance between the last surface of the first lens group (G1) and the first surface of the next lens (G2), $f_{II}$ represents the focal length of the middle lens component (G2), $v_{II}$ represents the resulting Abbe-number of the middle lens component (G2), $d_{II}$ represents the distance between the last surface of the middle lens component (G2) and the first surface of the last lens group (G3), $f_{III}$ represents the focal length of the last lens group (G3), $f_p$ represents the focal length of the first positive lens of the last lens group (G3), $n_p$ represents the refractive index of the first positive lens of the last lens group (G3), $v_P$ represents the Abbe-number of the first positive lens of the last lens group (G3), $n_N$ represents the refractive index of the negative lens of the last lens group (G3)

$v_N$ represents the Abbe-number of the negative lens of the last lens group (G3), and $r_{IV}$ represents the radius of the cemented surfaces between the first positive and the negative lens of the last lens group (G3).

The condition (1) is necessary to achieve a short effective focal length and sufficient long back focal length which enables the lens system to be used on a SLR-camera.

If the upper limit of this condition is not maintained the back focal length will be too short or the effective focal length becomes too long. If the lower limit of this condition (1) is passed over it becomes difficult to satisfy the Petzval-condition.

The conditions (2) and (3) mainly relate to the compensation of the astigmatism and the curvature of the image field. If the distance $d_4$ is too short or the radius $r_4$ is too long the curvature of the image field becomes concave to the object side, and the astigmatism gets high positive value, if $d_4$ is too long or $r_4$ too short the image field becomes convex to the object side and the astigmatism gets too high negative value.

Outside of the given limits a sufficient compensation of field curvature and astigmatism becomes problematic.

The condition (4) relates to the focal length of the middle lens component (G2). This component has to have a high positive refractive power in order to compensate the high negative Petzval coefficient of the negative front member and to achieve a positive refractive power of the entire lens system.

The condition (5) also relates to the middle lens component (G2). It requires, that the resulting Abbe-number of this component amounts from 30 to 45, which is necessary to compensate the high value of lateral chromatic aberrations, which are introduced by the negative front member. If the resulting Abbe-number is below 30, it becomes difficult to compensate the focal chromatic aberration, if it is higher than 45 the lateral chromatic aberrations can not be compensated sufficiently.

The condition (6) is very important for the compensation of astigmatism as well as coma. If the lower limit is violated astigmatism and coma get too high values, if the upper limit is not maintained under-compensation of these, aberration appears.

The condition (7) relates to the refractive power of the last lens group (G3), which should be between 2.1 f and 4 f in order to achieve a sufficient positive refractive power and a short effective focal length of the entire lens system.

The condition (8) relates on the first lens of the last lens group (G3), which lens is the positive member of a cemented doublet. It requires a high positive refractive power of this lens, which is necessary to offer good conditions for the compensation of the spherical and the focal chromatic aberrations in relation to the conditions (9), (10) and (11).

The conditions (9), (10) and (11) relate to the cemented doublet of the last lens group (G3).

Condition (9) requires that the refractive index $n_N$ of the negative lens of this cemented doublet is at least 1.15 times higher than the refractive index $n_P$ of the positive lens of this doublet.

This ratio in combination with condition (11) leads to sufficient compensation of the spherical aberration. Outside of the limits of these conditions the spherical aberration can not be correct sufficiently.

The condition (10) is necessary for the compensation of the lateral as well as the focal chromatic aberrations. If this condition is not fulfilled a sufficient compensation of the chromatic aberrations becomes problematic.

A lens system according to the present invention can be modified in many ways in order to obtain particular characteristics according to the desired application, whereby the basis design of the lens system as disclosed in claim 1 and 10 remains unchanged. Some of these modifications which have especially appropriate characteristics in different aspects are disclosed in the claims 3 to 9 and 12 to 15 by its numerical design parameters. All numerical data as well as the presented drawings of aberration curves refer to lens systems which have a back focal length S' of about 37 mm, that is to designs for the image size 24×36 mm, but this means no limitation of the invention to this image size.

A displacement of the image field versus the theoretically paraxial image position by −0.21 to −0.27 mm is the base for the presented curves of deviations. This displacement corresponds to the practical focusing of the lens system in order to achieve a maximal visual contrast at opened aperture stop. It follows a resulting focal length $f_{res}$, being shorter than the theoretical effective focal length f by about 0.1 mm, which is the result of calculations concerning paraxial rays. The given field angles sigma 1, the aperture ratios and the Seidel's-coefficients of the tables 1 and 2 also refer to this resulting focal length $f_{res}$.

The following tables comprise the Seidel's-coefficients of lens systems according to the claims 5 and 14 which are typical and preferred embodiments of the invention. The numerical data are multiplied by 1000 and rounded—by reasons of better clearness.

It represents in particular:

H: aberration-coefficient of the spherical aberration
C: aberration-coefficient of the meridional coma
A: aberration-coefficient of the astigmatism
P: aberration-coefficient of the Petzval condition
W: aberration-coefficient of the curvature of the image field
D: aberration-coefficient of the distortion
FQ: aberration-coefficient of the lateral chromatic aberr.
FL: aberration-coefficient of the chromatic focal aberration

TABLE 1

| | aberration-coefficients of a lens system according to claim 5. | | | | | | | |
|---|---|---|---|---|---|---|---|---|
| I | H | C | A | P | W | D | FQ | FL |
| 1 | 4 | 11 | 27 | 100 | 154 | 318 | −4.2 | 2 |
| 2 | −333 | 78 | −18 | −276 | −312 | 69 | −1.5 | −6 |
| 3 | 52 | 67 | 89 | 52 | 224 | 179 | −4.8 | 4 |
| 4 | −6456 | 1104 | −189 | −417 | −795 | 104 | −3.4 | −20 |
| 5 | 29608 | 232 | 2 | 351 | 355 | 3 | −0.9 | 112 |
| 6 | −112 | −66 | −39 | −107 | −185 | −86 | 12.2 | −21 |
| 7 | 97 | 73 | 54 | 92 | 200 | 110 | −7.1 | 10 |
| 8 | −39952 | 33 | 0 | −159 | −159 | 0 | −0.2 | −200 |
| 9 | 6917 | −955 | 132 | 277 | 541 | −56 | 12.6 | 92 |
| 10 | −4715 | 786 | −131 | −216 | −478 | 58 | −8.5 | −51 |
| 11 | 21709 | −1322 | 80 | 324 | 484 | −25 | 5.1 | 84 |
| Σ | 6819 | 40 | 4 | 22 | 30 | 673 | −0.7 | 4 |

TABLE 2

| | aberration-coefficients of a lens system according to claim 14. | | | | | | | |
|---|---|---|---|---|---|---|---|---|
| I | H | C | A | P | W | D | FQ | FL |
| 1 | 15 | 20 | 26 | 174 | 226 | 264 | −4.8 | 4 |
| 2 | −735 | 257 | −90 | −392 | −572 | 168 | −4.0 | −11 |
| 3 | 121 | 103 | 87 | 56 | 230 | 122 | −3.9 | 5 |
| 4 | −9028 | 1356 | −204 | −407 | −815 | 92 | −3.1 | −21 |
| 5 | 2180 | 470 | 101 | 0 | 202 | 22 | −3.1 | 15 |
| 6 | −2221 | −479 | −103 | 0 | −206 | −22 | 3.2 | −15 |
| 7 | 46125 | −320 | 2 | 391 | 395 | −3 | 0.6 | 84 |
| 8 | −4326 | 139 | −4 | −31 | −39 | 1 | 0.8 | 25 |
| 9 | 4 | 6 | 12 | −63 | −39 | −94 | 10.1 | −6 |
| 10 | 56 | 40 | 28 | 105 | 161 | 96 | −4.0 | 6 |
| 11 | −50542 | 405 | −3 | −189 | −195 | 2 | −1.6 | −198 |
| 12 | 26481 | −1987 | 149 | 375 | 673 | −39 | 8.8 | 117 |

TABLE 2-continued aberration-coefficients of a lens system according to claim 14.

| I | H | C | A | P | W | D | FQ | FL |
|---|---|---|---|---|---|---|---|---|
| Σ | 8130 | 11 | 2 | 20 | 24 | 607 | −0.9 | 4 |

The following tables show the numerical data of 9 embodiments of the present invention. They represent preferred embodiments of the disclosed fish eye lens system, but that means no limitation of the invention to these numerical data.

TABLE 3

Embodiment 1:

| | | | | | | | |
|---|---|---|---|---|---|---|---|
| L1 | r1 = 48.23 | | d1 = 1.33 | | n1 = 1.62041 | | v1 = 60.33 |
| | r2 = 18.18 | | d2 = 11.83 | | | | |
| L2 | r3 = 120 | | d3 = 1.7 | | n2 = 1.63854 | | v2 = 55.42 |
| | r4 = 13.3 | | d4 = 17.8 | | | | |
| L3 | r5 = 15.3 | | d5 = 3.2 | | n3 = 1.65446 | | v3 = 33.65 |
| | r6 = 70.0 | | d6 = 10.86 | | dB = 8.6 | | |
| L4 | r7 = 47.0 | | d7 = 3.5 | | n4 = 1.5168 | | v4 = 64.17 |
| L5 | r8 = −8.34 | | d8 = 1.55 | | n5 = 1.80518 | | v5 = 25.43 |
| | r9 = −22.8 | | d9 = 0.1 | | | | |
| L6 | r10 = −35.7 | | d10 = 1.5 | | n6 = 1.6727 | | v6 = 32.21 |
| | r11 = −24.0 | | | | | | |

$f = 15.9570$; $f_{res} = 15.8603$; $S' = 36.9697$; $2 \times \text{Sigma1} = 155.9°$

TABLE 4

Embodiment 2:

| | | | | | | | |
|---|---|---|---|---|---|---|---|
| L1 | r1 = 58.0 | | d1 = 1.6 | | n1 = 1.62041 | | v1 = 60.33 |
| | r2 = 21.0 | | d2 = 12.8 | | | | |
| L2 | r3 = 115.0 | | d3 = 1.4 | | n2 = 1.6583 | | v2 = 57.26 |
| | r4 = 14.4 | | d4 = 18.8 | | | | |
| L3 | r5 = 18.0 | | d5 = 3.52 | | n3 = 1.71736 | | v3 = 29.51 |
| | r6 = 58.8 | | d6 = 11.62 | | dB = 8.7 | | |
| L4 | r7 = 60.0 | | d7 = 3.86 | | n4 = 1.57957 | | v4 = 53.71 |
| L5 | r8 = −8.73 | | d8 = 1.73 | | n5 = 1.84666 | | v5 = 23.83 |
| | r9 = −25.0 | | d9 = 0.1 | | | | |
| L6 | r10 = −30.0 | | d10 = 1.8 | | n6 = 1.7495 | | v6 = 34.95 |
| | r11 = −20.0 | | | | | | |

$f = 15.1832$; $f_{res} = 15.1144$; $S' = 36.8231$; $2 \times \text{Sigma1} = 170°$

TABLE 5

Embodiment 3:

| | | | | | | | |
|---|---|---|---|---|---|---|---|
| L1 | r1 = 39.0 | | d1 = 1.6 | | n1 = 1.62015 | | v1 = 63.52 |
| | r2 = 17.175 | | d2 = 12.9 | | | | |
| L2 | r3 = 70.5 | | d3 = 1.4 | | n2 = 1.78831 | | v2 = 47.39 |
| | r4 = 14.025 | | d4 = 18.4 | | | | |
| L3 | r5 = 16.6 | | d5 = 3.5 | | n3 = 1.6727 | | v3 = 32.21 |
| | r6 = 90.0 | | d6 = 5.0 | | | | |
| F | r7 = ∞ | | d7 = 1.0 | | n4 = 1.54 | | v4 = 60 |
| | r8 = ∞ | | d8 = 5.565 | | dB = 3.3 | | |
| L4 | r9 = 47.9 | | d9 = 3.61 | | n5 = 1.48656 | | v5 = 84.47 |
| L5 | r10 = −8.4 | | d10 = 0.775 | | n6 = 1.7618 | | v6 = 26.95 |
| | r11 = −25.0 | | d11 = 0.1 | | | | |
| L6 | r12 = −31.5 | | d12 = 1.4 | | n7 = 1.75693 | | v7 = 31.8 |
| | r13 = −20.1 | | | | | | |

$f = 15.4525$; $f_{res} = 15.3677$; $S' = 36.783$; $2 \times \text{Sigma1} = 153°$

TABLE 6

Embodiment 4:

| | | | | | | | |
|---|---|---|---|---|---|---|---|
| L1 | r1 = 45.66 | | d1 = 1.62 | | n1 = 1.78831 | | v1 = 47.39 |
| | r2 = 17.71 | | d2 = 13.8 | | | | |
| L2 | r3 = 81.2 | | d3 = 1.42 | | n2 = 1.62015 | | v2 = 63.52 |
| | r4 = 14.865 | | d4 = 18.265 | | | | |
| L3 | r5 = 17.453 | | d5 = 3.501 | | n3 = 1.72047 | | v3 = 34.61 |
| | r6 = 80.0 | | d6 = 5.3 | | | | |
| F | r7 = ∞ | | d7 = 1.0 | | n4 = 1.54 | | v4 = 60 |
| | r8 = ∞ | | d8 = 6.18 | | dB = 3.9 | | |
| L4 | r9 = 44.45 | | d9 = 3.8 | | n5 = 1.48656 | | v5 = 84.47 |
| | r10 = −9.0 | | d10 = 0.88 | | n6 = 1.7618 | | v6 = 26.95 |
| L5 | r11 = −25.0 | | d11 = 0.1 | | | | |
| L6 | r12 = −40.0 | | d12 = 1.5 | | n7 = 1.75693 | | v7 = 31.8 |

TABLE 6-continued

Embodiment 4:

r13 = −26.7

$f = 15.6479$; $f_{res} = 15.5519$; $S' = 36.8124$; $2 \times \text{Sigma1} = 153.3°$

TABLE 7

Embodiment 5:

| | | | | | | | |
|---|---|---|---|---|---|---|---|
| L1 | r1 = 51.5 | | d1 = 1.6 | | n1 = 1.77314 | | v1 = 49.59 |
| | r2 = 18.5 | | d2 = 13.5 | | | | |
| L2 | r3 = 57.1 | | d3 = 1.4 | | n2 = 1.77314 | | v2 = 49.59 |
| | r4 = 14.05 | | d4 = 19.4 | | | | |
| L3 | r5 = 16.9 | | d5 = 3.408 | | n3 = 1.71736 | | v3 = 29.51 |
| | r6 = 71.0 | | d6 = 5.34 | | | | |
| F | r7 = ∞ | | d7 = 1.0 | | n4 = 1.54 | | v4 = 60 |
| | r8 = ∞ | | d8 = 5.5 | | dB = 3.0 | | |
| L4 | r9 = 49.0 | | d9 = 3.61 | | n5 = 1.48656 | | v5 = 84.47 |
| L5 | r10 = −8.93 | | d10 = 0.75 | | n6 = 1.80518 | | v6 = 25.43 |
| | r11 = −22.8 | | d11 = 0.1 | | | | |
| L6 | r12 = −44.0 | | d12 = 1.4 | | n7 = 1.72373 | | v7 = 38.62 |
| | r13 = −25.7 | | | | | | |

$f = 14.0624$; $f_{res} = 13.9762$; $S' = 36.8262$; $2 \times \text{Sigma1} = 175°$

TABLE 8

Embodiment 6:

| | | | | | | | |
|---|---|---|---|---|---|---|---|
| L1 | r1 = 39.69 | | d1 = 1.5 | | n1 = 1.744 | | v1 = 44.77 |
| | r2 = 17.5 | | d2 = 13.44 | | | | |
| L2 | r3 = 97.0 | | d3 = 1.4 | | n2 = 1.6583 | | v2 = 57.26 |
| | r4 = 14.0 | | d4 = 16.6 | | | | |
| F | r5 = ∞ | | d5 = 1.0 | | n3 = 1.54 | | v3 = 60 |
| | r6 = ∞ | | d6 = 1.0 | | | | |
| L3 | r7 = 16.75 | | d7 = 3.4 | | n4 = 1.68134 | | v4 = 31.94 |
| | r8 = 90.0 | | d8 = 11.53 | | dB = 9.0 | | |
| L4 | r9 = 49.3 | | d9 = 3.6 | | n5 = 1.48656 | | v5 = 84.47 |
| L5 | r10 = −8.75 | | d10 = 0.65 | | n6 = 1.7847 | | v6 = 26.08 |
| | r11 = −24.2 | | d11 = 0.1 | | | | |
| L6 | r12 = −34.2 | | d12 = 1.2 | | n7 = 1.80741 | | v7 = 31.61 |
| | r13 = −22.5 | | | | | | |

$f = 15.5235$; $f_{res} = 15.4356$; $S' = 37.1825$; $2 \times \text{Sigma1} = 153°$

TABLE 9

Embodiment 7:

| | | | | | | | |
|---|---|---|---|---|---|---|---|
| L1 | r1 = 53.9 | | d1 = 1.6 | | n1 = 1.6209 | | v1 = 60.31 |
| | r2 = 19.7 | | d2 = 12.8 | | | | |
| L2 | r3 = −335.0 | | d3 = 1.4 | | n2 = 1.48656 | | v2 = 84.47 |
| | r4 = 13.85 | | d4 = 17.85 | | | | |
| L3 | r5 = 16.4 | | d5 = 2.3 | | n3 = 1.69761 | | v3 = 38.57 |
| L4 | r6 = −75.0 | | d6 = 0.8 | | n4 = 1.69981 | | v4 = 34.68 |
| | r7 = 68.0 | | d7 = 3.94 | | | | |
| F | r8 = ∞ | | d8 = 1.0 | | n5 = 1.54 | | v5 = 60 |
| | r9 = ∞ | | d9 = 6.45 | | dB = 4.0 | | |
| L5 | r10 = 57.5 | | d10 = 3.7 | | n6 = 1.53315 | | v6 = 57.98 |
| L6 | r11 = −8.25 | | d11 = 2.76 | | n7 = 1.80518 | | v7 = 25.43 |
| | r12 = −18.4 | | | | | | |

$f = 16.8581$; $f_{res} = 16.7559$; $S' = 36.8910$; $2 \times \text{Sigma1} = 152.3°$

TABLE 10

Embodiment 8:

| | | | | | | | |
|---|---|---|---|---|---|---|---|
| L1 | r1 = 39.0 | | d1 = 1.5 | | n1 = 1.78831 | | v1 = 47.39 |
| | r2 = 17.3 | | d2 = 13.67 | | | | |
| L2 | r3 = 105.0 | | d3 = 1.4 | | n2 = 1.62015 | | v2 = 63.52 |
| | r4 = 14.5 | | d4 = 16.65 | | | | |
| F | r5 = ∞ | | d5 = 1.0 | | n3 = 1.54 | | v3 = 60 |
| | r6 = ∞ | | d6 = 1.0 | | | | |
| L3 | r7 = 17.17 | | d7 = 1.0 | | n4 = 1.77314 | | v4 = 49.59 |
| L4 | r8 = 12.6 | | d8 = 3.0 | | n5 = 1.69761 | | v5 = 38.57 |

TABLE 10-continued

Embodiment 8:

|  | r9 = 100.0 | d9 = 11.41 |  | dB = 9.0 |
| --- | --- | --- | --- | --- |
| L5 | r10 = 47.8 | d10 = 3.7 | n6 = 1.48656 | v6 = 84.47 |
| L6 | r11 = −8.58 | d11 = 1.25 | n7 = 1.7618 | v7 = 26.95 |
|  | r12 = −17.77 |  |  |  | f = 15.4858; f$_{res}$ = 15.4000; S' = 36.9716; 2× Sigma1 = 151.4°

TABLE 11

Embodiment 9:

| L1 | r1 = 54.45 | d1 = 1.6 | n1 = 1.6968 | v1 = 55.41 |
| --- | --- | --- | --- | --- |
|  | r2 = 18.26 | d2 = 13.86 |  |  |
| L2 | r3 = 74.25 | d3 = 1.4 | n2 = 1.69673 | v2 = 56.42 |
|  | r4 = 14.01 | d4 = 17.12 |  |  |
| F | r5 = ∞ | d5 = 1.0 | n3 = 1.54 | v3 = 60 |
|  | r6 = ∞ | d6 = 1.0 |  |  |
| L3 | r7 = 16.5 | d7 = 0.9 | n4 = 1.6779 | v4 = 55.2 |
| L4 | r8 = 11.9 | d8 = 2.5 | n5 = 1.68064 | v5 = 37.18 |
|  | r9 = 78.0 | d9 = 10.87 |  | dB = 8.7 |
| L5 | r10 = 48.51 | d10 = 3.58 | n6 = 1.48656 | v6 = 84.47 |
| L6 | r11 = −8.3 | d11 = 1.75 | n7 = 1.80518 | v7 = 25.43 |
|  | r12 = −16.3844 |  |  |  | f = 14.4138; f$_{res}$ = 14.3341; S' = 36.9519; 2× Sigma1 = 170°

What I claim is:

1. A six element fish eye lens system comprising from the object to the image side:
   a first meniscus shaped lens (L1) of negative refractive power curved towards the object,
   a second lens (L2) of negative refractive power curved towards the object,
   a third positive meniscus lens (L3) of positive refractive power curved towards the object,
   an aperture stop (B),
   a fourth lens (L4) of positive refractive power curved towards the image,
   a fifth meniscus shaped lens (L5) of negative refractive power curved towards the image, which lens (L5) is cemented with the fourth lens (L4), and
   a sixth meniscus shaped positive lens (L6) curved towards the image.

2. A six element fish eye lens system according to claim 1 satisfying the following conditions:

| 0.6 | < | f$_I$/f | < | 1.2 | (1) |
| --- | --- | --- | --- | --- | --- |
| 1.0 | < | d$_4$/f | < | 1.5 | (2) |
| 0.75 | < | r$_4$/f | < | 1.1 | (3) |
| 1.5 | < | f$_{II}$/f | < | 2.5 | (4) |
| 30 | < | v$_{II}$ | < | 45 | (5) |
| 0.5 | < | d$_{II}$/f | < | 0.95 | (6) |
| 2.1 | < | f$_{III}$/f | < | 4.0 | (7) |
| 0.7 | < | f$_P$/f | < | 1.25 | (8) |
| 1.15 | < | n$_N$/n$_P$ |  |  | (9) |
|  |  | v$_N$/v$_P$ | < | 0.5 | (10) |
| 0.45 | < | r$_{IV}$/f | < | 0.75 | (11) |

Wherein:
f represents the effective paraxial focal length of the whole lens system,
f$_I$ represents the focal length of the first lens group (G1),
r$_4$ represents the fourth radius of the lens system,
d$_4$ represents the distance between the last surface of the first lens group (G1) and the first surface of the next lens (G2),
f$_{II}$ represents the focal length of the middle lens component (G2),
v$_{II}$ represents the resulting Abbe-number of the middle lens component (G2),
d$_{II}$ represents the distance between the last surface of the middle lens component (G2) and the first surface of the last lens group (G3),
f$_{III}$ represents the focal length of the last lens group (G3),
f$_P$ represents the focal length of the first positive lens of the last lens group (G3),
n$_P$ represents the refractive index of the first positive lens of the last lens group (G3),
v$_P$ represents the Abbe-number of the first positive lens of the last lens group (G3),
n$_N$ represents the refractive index of the negative lens of the last lens group (G3),
v$_N$ represents the Abbe-number of the negative lens of the last lens group (G3), and
r$_{IV}$ represents the radius of the cemented surfaces between the first positive and the negative lens of the last lens group (G3).

3. A fish eye lens system according to claim 2 having the following design parameters, wherein
ri represents the radius of the i-th lens surface,
di represents the distance between the i-th and the next lens surface,
ni represents the refraction index of the i-th lens,
vi represents the Abbe's number of the i-th lens,
S' represents the back focal length,
f represents the effective paraxial focal length,
f$_{res}$ represents the resulting focal length, which provides maximum visual contrast at opened aperture stop,
dB represents the distance between the aperture stop and the lens surface preceding it on the object side,
2×Sigma 1 represents the total field angle:

| L1 | r1 = 48.23 | d1 = 1.33 | n1 = 1.62041 | v1 = 60.33 |
| --- | --- | --- | --- | --- |
|  | r2 = 18.18 | d2 = 11.83 |  |  |
| L2 | r3 = 120 | d3 = 1.7 | n2 = 1.63854 | v2 = 55.42 |
|  | r4 = 13.3 | d4 = 17.8 |  |  |
| L3 | r5 = 15.3 | d5 = 3.2 | n3 = 1.65446 | v3 = 33.65 |
|  | r6 = 70.0 | d6 = 10.86 |  | dB = 8.6 |
| L4 | r7 = 47.0 | d7 = 3.5 | n4 = 1.5168 | v4 = 64.17 |
| L5 | r8 = −8.34 | d8 = 1.55 | n5 = 1.80518 | v5 = 25.43 |
|  | r9 = −22.8 | d9 = 0.1 |  |  |
| L6 | r10 = −35.7 | d10 = 1.5 | n6 = 1.6727 | v6 = 32.21 |
|  | r11 = −24.0 |  |  |  | f = 15.9570; f$_{res}$ = 15.8603; S' = 36.9697; 2× Sigma1 = 155.9°

4. A fish eye lens system according to claim 2 having the following design parameters, wherein
ri represents the radius of the i-th lens surface,
di represents the distance between the i-th and the
ni represents the refraction index of the i-th lens,
vi represents the Abbe's number of the i-th lens,
S' represents the back focal length,
f represents the effective paraxial focal length,
f$_{res}$ represents the resulting focal length, which provides maximum visual contrast at opened aperture stop,
dB represents the distance between the aperture stop and the lens surface preceding it on the object side,
2×Sigma 1 represents the total field angle:

| L1 | r1 = 58.0 | d1 = 1.6 | n1 = 1.62041 | v1 = 60.33 |
| --- | --- | --- | --- | --- |
|  | r2 = 21.0 | d2 = 12.8 |  |  |
| L2 | r3 = 115.0 | d3 = 1.4 | n2 = 1.6583 | v2 = 57.26 |
|  | r4 = 14.4 | d4 = 18.8 |  |  |
| L3 | r5 = 18.0 | d5 = 3.52 | n3 = 1.71736 | v3 = 29.51 |
|  | r6 = 58.8 | d6 = 11.62 |  | dB = 8.7 |
| L4 | r7 = 60.0 | d7 = 3.86 | n4 = 1.57957 | v4 = 53.71 |
| L5 | r8 = −8.73 | d8 = 1.73 | n5 = 1.84666 | v5 = 23.83 |

-continued

|    | r9 = −25.0  | d9 = 0.1   |           |           |
|----|-------------|------------|-----------|-----------|
| L6 | r10 = −30.0 | d10 = 1.8  | n6 = 1.7495 | v6 = 34.95 |
|    | r11 = −20.0 |            |           |           | f = 15.1832; $f_{res}$ = 15.1144; S' = 36.8231; 2× Sigma 1 = 170°

5. A six element fish eye lens system according to claim 2 comprising a plane-parallel filter element (F) between the lens elements.

6. A fish eye lens system according to claim 5 having the following design parameters, wherein
 ri represents the radius of the i-th lens surface,
 di represents the distance between the i-th and the next lens surface,
 ni represents the refraction index of the i-th lens,
 vi represents the Abbe's number of the i-th lens,
 S' represents the back focal length,
 f represents the effective paraxial focal length,
 $f_{res}$ represents the resulting focal length, which provides maximum visual contrast at opened aperture stop,
 dB represents the distance between the aperture stop and the lens surface preceding it on the object side,
 2×Sigma 1 represents the total field angle:

| L1 | r1 = 39.0    | d1 = 1.6    | n1 = 1.62015 | v1 = 63.52 |
|----|--------------|-------------|--------------|------------|
|    | r2 = 17.175  | d2 = 12.9   |              |            |
| L2 | r3 = 70.5    | d3 = 1.4    | n2 = 1.78831 | v2 = 47.39 |
|    | r4 = 14.025  | d4 = 18.4   |              |            |
| L3 | r5 = 16.6    | d5 = 3.5    | n3 = 1.6727  | v3 = 32.21 |
|    | r6 = 90.0    | d6 = 5.0    |              |            |
| F  | r7 = ∞       | d7 = 1.0    | n4 = 1.54    | v4 = 60    |
|    | r8 = ∞       | d8 = 5.565  | dB = 3.3     |            |
| L4 | r9 = 47.9    | d9 = 3.61   | n5 = 1.48656 | v5 = 84.47 |
| L5 | r10 = −8.4   | d10 = 0.775 | n6 = 1.7618  | v6 = 26.95 |
|    | r11 = −25.0  | d11 = 0.1   |              |            |
| L6 | r12 = −31.5  | d12 = 1.4   | n7 = 1.75693 | v7 = 31.8  |
|    | r13 = −20.1  |             |              |            | f = 15.4525; $f_{res}$ = 15.3677; S' = 36.783; 2× Sigma 1 = 153°

7. A fish eye lens system according to claim 5 having the following design parameters, wherein
 ri represents the radius of the i-th lens surface,
 di represents the distance between the i-th and the next lens surface,
 ni represents the refraction index of the i-th lens,
 vi represents the Abbe's number of the i-th lens,
 S' represents the back focal length [and],
 f represents the effective paraxial focal length,
 $f_{res}$ represents the resulting focal length, which provides maximum visual contrast at opened aperture stop,
 dB represents the distance between the aperture stop and the lens surface preceding it on the object side,
 2×Sigma 1 represents the total field angle:

| L1 | r1 = 45.66   | d1 = 1.62   | n1 = 1.78831 | v1 = 47.39 |
|----|--------------|-------------|--------------|------------|
|    | r2 = 17.71   | d2 = 13.8   |              |            |
| L2 | r3 = 81.2    | d3 = 1.42   | n2 = 1.62015 | v2 = 63.52 |
|    | r4 = 14.865  | d4 = 18.265 |              |            |
| L3 | r5 = 17.453  | d5 = 3.501  | n3 = 1.72047 | v3 = 34.61 |
|    | r6 = 80.0    | d6 = 5.3    |              |            |
| F  | r7 = ∞       | d7 = 1.0    | n4 = 1.54    | v4 = 60    |
|    | r8 = ∞       | d8 = 6.18   | dB = 3.9     |            |
| L4 | r9 = 44.45   | d9 = 3.8    | n5 = 1.48656 | v5 = 84.47 |
|    | r10 = −9.0   | d10 = 0.88  | n6 = 1.7618  | v6 = 26.95 |
| L5 | r11 = −25.0  | d11 = 0.1   |              |            |
| L6 | r12 = −40.0  | d12 = 1.5   | n7 = 1.75693 | v7 = 31.8  |
|    | r13 = −26.7  |             |              |            | f = 15.6479; $f_{res}$ = 15.5519; S' = 36.8124; 2× Sigma 1 = 153.3°

8. A fish eye lens system according to claim 5 having the following design parameters, wherein
 ri represents the radius of the i-th lens surface,
 di represents the distance between the i-th and the next lens surface,
 ni represents refraction index of the i-th lens,
 vi represents the Abbe's number of the i-th lens,
 S' represents the back focal length [and],
 f represents the effective paraxial focal length,
 $f_{res}$ represents the resulting focal length, which provides maximum visual contrast at opened aperture stop,
 dB represents the distance between the aperture stop and the lens surface preceding it on the object side,
 2×Sigma 1 represents the total field angle:

| L1 | r1 = 51.5    | d1 = 1.6    | n1 = 1.77314 | v1 = 49.59 |
|----|--------------|-------------|--------------|------------|
|    | r2 = 18.5    | d2 = 13.5   |              |            |
| L2 | r3 = 57.1    | d3 = 1.4    | n2 = 1.77314 | v2 = 49.59 |
|    | r4 = 14.05   | d4 = 19.4   |              |            |
| L3 | r5 = 16.9    | d5 = 3.408  | n3 = 1.71736 | v3 = 29.51 |
|    | r6 = 71.0    | d6 = 5.34   |              |            |
| F  | r7 = ∞       | d7 = 1.0    | n4 = 1.54    | v4 = 60    |
|    | r8 = ∞       | d8 = 5.5    | dB = 3.0     |            |
| L4 | r9 = 49.0    | d9 = 3.61   | n5 = 1.48656 | v5 = 84.47 |
| L5 | r10 = −8.93  | d10 = 0.75  | n6 = 1.80518 | v6 = 25.43 |
|    | r11 = −22.8  | d11 = 0.1   |              |            |
| L6 | r12 = −44.0  | d12 = 1.4   | n7 = 1.72373 | v7 = 38.62 |
|    | r13 = −25.7  |             |              |            | f = 14.0624; $f_{res}$ = 13.9762; S' = 36.8262; 2× Sigma 1 = 175°

9. A fish eye lens system according to claim 5 having the following design parameters, wherein
 ri represents the radius of the i-th lens surface,
 di represents the distance between the i-th and the next lens surface,
 ni represents the refraction index of the i-th lens,
 vi represents the Abbe's number of the i-th lens,
 S' represents the back focal length [and],
 f represents the effective paraxial focal length,
 $f_{res}$ represents the resulting focal length, which provides maximum visual contrast at opened aperture stop,
 dB represents the distance between the aperture stop and the lens surface preceding it on the object side,
 2×Sigma 1 represents the total field angle:

| L1 | r1 = 39.69   | d1 = 1.5    | n1 = 1.744   | v1 = 44.77 |
|----|--------------|-------------|--------------|------------|
|    | r2 = 17.5    | d2 = 13.44  |              |            |
| L2 | r3 = 97.0    | d3 = 1.4    | n2 = 1.6583  | v2 = 57.26 |
|    | r4 = 14.0    | d4 = 16.6   |              |            |
| F  | r5 = ∞       | d5 = 1.0    | n3 = 1.54    | v3 = 60    |
|    | r6 = ∞       | d6 = 1.0    |              |            |
| L3 | r7 = 16.75   | d7 = 3.4    | n4 = 1.68134 | v4 = 31.94 |
|    | r8 = 90.0    | d8 = 11.53  | dB = 9.0     |            |
| L4 | r9 = 49.3    | d9 = 3.6    | n5 = 1.48656 | v5 = 84.47 |
| L5 | r10 = −8.75  | d10 = 0.65  | n6 = 1.7847  | v6 = 26.08 |
|    | r11 = −24.2  | d11 = 0.1   |              |            |
| L6 | r12 = −34.2  | d12 = 1.2   | n7 = 1.80741 | v7 = 31.61 |
|    | r13 = −22.5  |             |              |            | f = 15.5235; $f_{res}$ = 15.4356; S' = 37.1825; 2× Sigma 1 = 153°

10. A six element fish eye lens system comprising from the object to the image side:
 a first meniscus shaped lens (L1) of negative refractive power curved towards the object,
 a second lens (L2) of negative refractive power curved towards the object,
 a first cemented doublet (L3;L4; C2) of positive refractive power curved towards the object,
 an aperture stop (B), and a second cemented doublet (L5;L6; G3) of positive refractive power curved towards the image.

11. A six element fish eye lens system according to claim 10 satisfying the following conditions:

| | | | | |
|---|---|---|---|---|
| 0.6 | < | $f_I/f$ | < 1.2 | (1) |
| 1.0 | < | $d_4/f$ | < 1.5 | (2) |
| 0.75 | < | $r_4/f$ | < 1.1 | (3) |
| 1.5 | < | $f_{II}/f$ | < 2.5 | (4) |
| 30 | < | $v_{II}$ | < 45 | (5) |
| 0.5 | < | $d_{II}/f$ | < 0.95 | (6) |
| 2.1 | < | $f_{III}/f$ | < 4.0 | (7) |
| 0.7 | < | $f_p/f$ | < 1.25 | (8) |
| 1.15 | < | $n_N/n_P$ | | (9) |
| | | $v_N/v_P$ | < 0.5 | (10) |
| 0.45 | < | $r_{IV}/f$ | < 0.75 | (11) |

Wherein:
f represents the effective paraxial focal length of the whole lens system,
$f_I$ represents the focal length of the first lens group (G1),
$r_4$ represents the fourth radius of the lens system,
$d_4$ represents the distance between the last surface of the first lens group (G1) and the first surface of the next lens (G2),
$f_{II}$ represents the focal length of the middle lens component (G2),
$v_{II}$ represents the resulting Abbe-number of the middle lens component (G2),
$d_{II}$ represents the distance between the last surface of the middle lens component (G2) and the first surface of the last lens group (G3),
$f_{III}$ represents the focal length of the last lens group (G3),
$f_p$ represents the focal length of the first positive lens of the last lens group (G3),
$n_P$ represents the refractive index of the first positive lens of the last lens group (G3),
$v_P$ represents the Abbe-number of the first positive lens of the last lens group (G3),
$n_N$ represents the refractive index of the negative lens of the last lens group (G3)
$v_N$ represents the Abbe-number of the negative lens of the last lens group (G3), and
$r_{IV}$ represents the radius of the cemented surfaces between the first positive and the negative lens of the last lens group (G3).

12. A six element fish eye lens system according to claim 11 comprising a plane-parallel filter element (F) between the lens elements.

13. A fish eye lens system according to claim 12 having the following design parameters, wherein
ri represents the radius of the i-th lens surface,
di represents the distance between the i-th and the next lens surface,
ni represents the refraction index of the i-th lens,
vi represents the Abbe's number of the i-th lens,
S' represents the back focal length [and],
f represents the effective paraxial focal length,
$f_{res}$ represents the resulting focal length, which provides maximum visual contrast at opened aperture stop,
dB represents the distance between the aperture stop and the lens surface preceding it on the object side,
2×Sigma 1 represents the total field angle:

| | | | | |
|---|---|---|---|---|
| L1 | r1 = 53.9 | d1 = 1.6 | n1 = 1.6209 | v1 = 60.31 |
| | r2 = 19.7 | d2 = 12.8 | | |
| L2 | r3 = −335.0 | d3 = 1.4 | n2 = 1.48656 | v2 = 84.47 |
| | r4 = 13.85 | d4 = 17.85 | | |
| L3 | r5 = 16.4 | d5 = 2.3 | n3 = 1.69761 | v3 = 38.57 |
| L4 | r6 = −75.0 | d6 = 0.8 | n4 = 1.69981 | v4 = 34.68 |
| | r7 = 68.0 | d7 = 3.94 | | |
| F | r8 = ∞ | d8 = 1.0 | n5 = 1.54 | v5 = 60 |
| | r9 = ∞ | d9 = 6.45 | dB = 4.0 | |
| L5 | r10 = 57.5 | d10 = 3.7 | n6 = 1.53315 | v6 = 57.98 |
| L6 | r11 = −8.25 | d11 = 2.76 | n7 = 1.80518 | v7 = 25.43 |
| | r12 = −18.4 | | | | f = 16.8581; $f_{res}$ = 16.7559; S' = 36.8910; 2x Sigma1 = 152.3°

14. A fish eye lens system according to claim 12 having the following design parameters, wherein
ri represents the radius of the i-th lens surface,
di represents the distance between the i-th and the next lens surface,
ni represents the refraction index of the i-th lens,
vi represents the Abbe's number of the i-th lens,
S' represents the back focal length [and],
f represents the effective paraxial focal length,
$f_{res}$ represents the resulting focal length, which provides maximum visual contrast at opened aperture stop,
dB represents the distance between the aperture stop and the lens surface preceding it on the object side,
2×Sigma 1 represents the total field angle:

| | | | | |
|---|---|---|---|---|
| L1 | r1 = 39.0 | d1 = 1.5 | n1 = 1.78831 | v1 = 47.39 |
| | r2 = 17.3 | d2 = 13.67 | | |
| L2 | r3 = 105.0 | d3 = 1.4 | n2 = 1.62015 | v2 = 63.52 |
| | r4 = 14.5 | d4 = 16.65 | | |
| F | r5 = ∞ | d5 = 1.0 | n3 = 1.54 | v3 = 60 |
| | r6 = ∞ | d6 = 1.0 | | |
| L3 | r7 = 17.17 | d7 = 1.0 | n4 = 1.77314 | v4 = 49.59 |
| L4 | r8 = 12.6 | d8 = 3.0 | n5 = 1.69761 | v5 = 38.57 |
| | r9 = 100.0 | d9 = 11.41 | dB = 9.0 | |
| L5 | r10 = 47.8 | d10 = 3.7 | n6 = 1.48656 | v6 = 84.47 |
| L6 | r11 = −8.58 | d11 = 1.25 | n7 = 1.7618 | v7 = 26.95 |
| | r12 = −17.77 | | | | f = 15.4858; $f_{res}$ = 15.4000; S' = 36.9716; 2x Sigma1 = 151.4°

15. A fish eye lens system according to claim 12 having the following design parameters, wherein
ri represents the radius of the i-th lens surface,
di represents the distance between the i-th and the next lens surface,
ni represents the refraction index of the i-th lens,
vi represents the Abbe's number of the i-th lens,
S' represents the back focal length [and],
f represents the effective paraxial focal length,
$f_{res}$ represents the resulting focal length, which provides maximum visual contrast at opened aperture stop,
dB represents the distance between the aperture stop and the lens surface preceding it on the object side,
2×Sigma 1 represents the total field angle:

| | | | | |
|---|---|---|---|---|
| L1 | r1 = 54.45 | d1 = 1.6 | n1 = 1.6968 | v1 = 55.41 |
| | r2 = 18.26 | d2 = 13.86 | | |
| L2 | r3 = 74.25 | d3 = 1.4 | n2 = 1.69673 | v2 = 56.42 |
| | r4 = 14.01 | d4 = 17.12 | | |
| F | r5 = ∞ | d5 = 1.0 | n3 = 1.54 | v3 = 60 |
| | r6 = ∞ | d6 = 1.0 | | |
| L3 | r7 = 16.5 | d7 = 0.9 | n4 = 1.6779 | v4 = 55.2 |
| L4 | r8 = 11.9 | d8 = 2.5 | n5 = 1.68064 | v5 = 37.18 |
| | r9 = 78.0 | d9 = 10.87 | dB = 8.7 | |
| L5 | r10 = 48.51 | d10 = 3.58 | n6 = 1.48656 | v6 = 84.47 |
| L6 | r11 = −8.3 | d11 = 1.75 | n7 = 1.80518 | v7 = 25.43 |
| | r12 = −16.3844 | | | | f = 14.4138; $f_{res}$ = 14.3341; S' = 36.9519; 2x Sigma1 = 170°

* * * * *

UNITED STATES PATENT AND TRADEMARK OFFICE
CERTIFICATE OF CORRECTION

PATENT NO. : 4,647,161

DATED : March 3, 1987

INVENTOR(S) : Rolf Müller

It is certified that error appears in the above-identified patent and that said Letters Patent is hereby corrected as shown below:

IN THE SPECIFICATION:

Column 1, line 19, change "3,331,653" to --3,331,652--.

Column 3, line 66, change "$f_p/f$" to --$f_p/f$--;

Column 4, line 23, change "$f_p$" to --$f_p$--;

line 25, change "$n_p$" to --$n_p$--.

Column 5, line 29, change "correct" to --corrected--.

line 37, change "basis" to --basic--.

Column 6, line 68, in Table 2, line I12, the numbers need to be aligned under the correct columns.

Column 7, line 67, in Table 6, move "L5" up one line.

IN THE CLAIMS:

Column 9, line 51, change "$f_p/f$" to --$f_p/f$--;

Column 10, line 50, after "the", third occurrence, insert --next lens surface,--.

UNITED STATES PATENT AND TRADEMARK OFFICE
CERTIFICATE OF CORRECTION

PATENT NO. : 4,647,161

DATED : March 3, 1987

INVENTOR(S) : Rolf Müller

It is certified that error appears in the above-identified patent and that said Letters Patent is hereby corrected as shown below:

Column 11, line 13, after "the", third occurrence,
    insert --next lens surface,--.
Column 11, line 64, move "L5" up one line.
Column 12, line 66, change "C2" to --G2--.
Column 13, line 13, change "$f_p/f$" to --$f_P/f$--;
Column 13, line 35, change "$f_p$" to --$f_P$--.

Signed and Sealed this

Twentieth Day of June, 1989

Attest:

DONALD J. QUIGG

Attesting Officer     Commissioner of Patents and Trademarks